United States Patent [19]
Robertson et al.

[11] 3,891,783
[45] June 24, 1975

[54] METHOD AND APPARATUS FOR CHEESE MANUFACTURE

[75] Inventors: Peter Struan Robertson; Raymond Bysouth, both of Palmerston North, New Zealand

[73] Assignee: New Zealand Dairy Research Institute, Palmerston North, New Zealand

[22] Filed: Mar. 4, 1974

[21] Appl. No.: 448,025

Related U.S. Application Data

[63] Continuation of Ser. No. 271,236, July 13, 1972, abandoned.

[30] Foreign Application Priority Data

July 13, 1971 New Zealand .................. 164291

[52] U.S. Cl. .................. 426/478; 99/452; 99/460; 426/491; 426/516; 426/518
[51] Int. Cl. .................................. A23c 19/02
[58] Field of Search ............ 426/361, 36, 478, 491, 426/512, 516, 518; 99/452, 453, 456, 460, 464, 466

[56] References Cited
UNITED STATES PATENTS

| | | | |
|---|---|---|---|
| 3,468,026 | 9/1969 | Robertson et al. | 425/85 |
| 3,520,697 | 7/1970 | Bertidge | 426/36 |
| 3,543,403 | 12/1970 | Speglic et al. | 426/495 X |
| 3,716,376 | 2/1973 | Clark | 99/115 |

OTHER PUBLICATIONS

Olson, N. F., Automation in the Cheese Industry: A Review, Journal of Dairy Science, Vol. 53, No. 8, 1970, (pp. 1,144–1,150) SF221J8.

Bysouth et al., A Tomer Method of Cheddaring and Milling, New Zealand Journal of Dairy Technology, Vol. 3, No. 1, 1968, (pp. 21–22).

*Primary Examiner*—David M. Naff
*Attorney, Agent, or Firm*—Holman & Stern

[57] ABSTRACT

Cheese is make using a process and apparatus wherein drained curd passes by its own weight downwardly through a vertical curd fusion chamber. The chamber has an upper portion having sides which are substantially parallel and a lower tapered portion having a horizontal cross section which diminishes gradually towards the lower end of the chamber. While descenting through the chamber, the curd remains in the chamber until a desired pH is obtained and whey retained by the curd is removed through drains in the external wall of the chamber and through internal slotted vertical pipes located internally within the chamber so as to be surrounded by curd. Prior to discharge from the lower tapered portion of the chamber, the descending curd is divided into a plurality of separate columns and the columns are cut into pieces during or after discharge.

27 Claims, 5 Drawing Figures

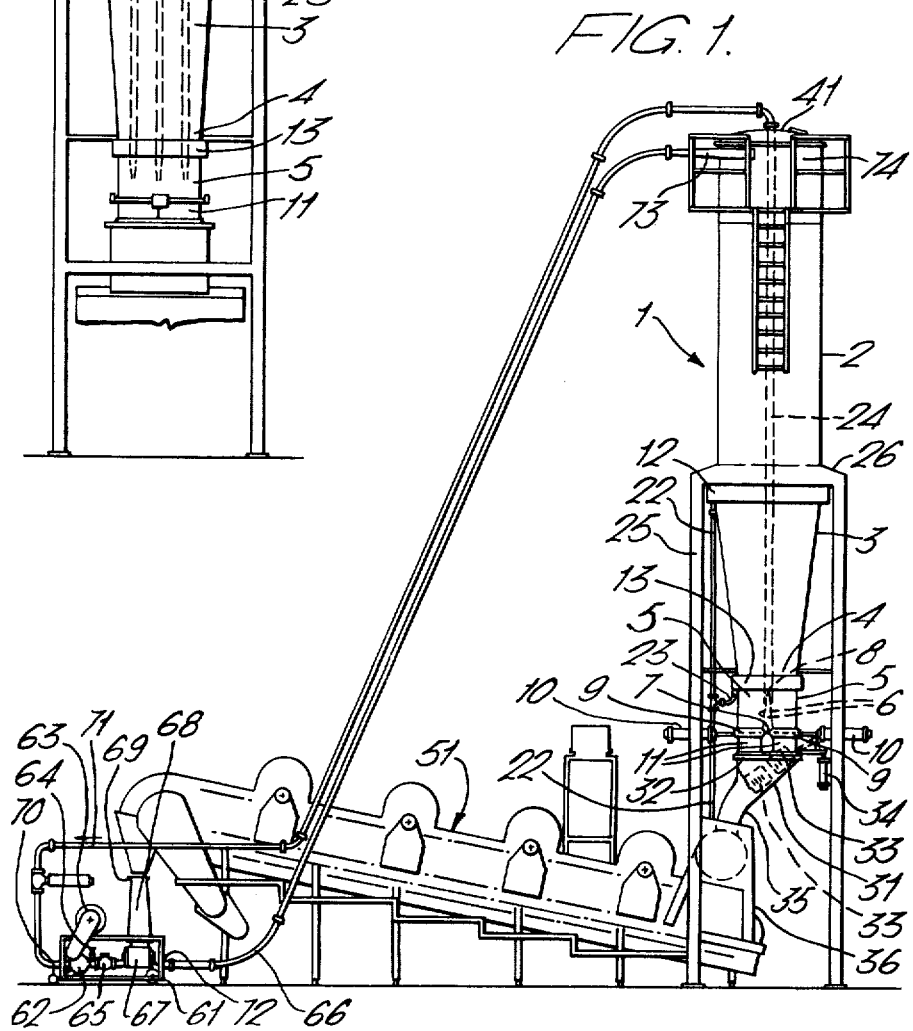

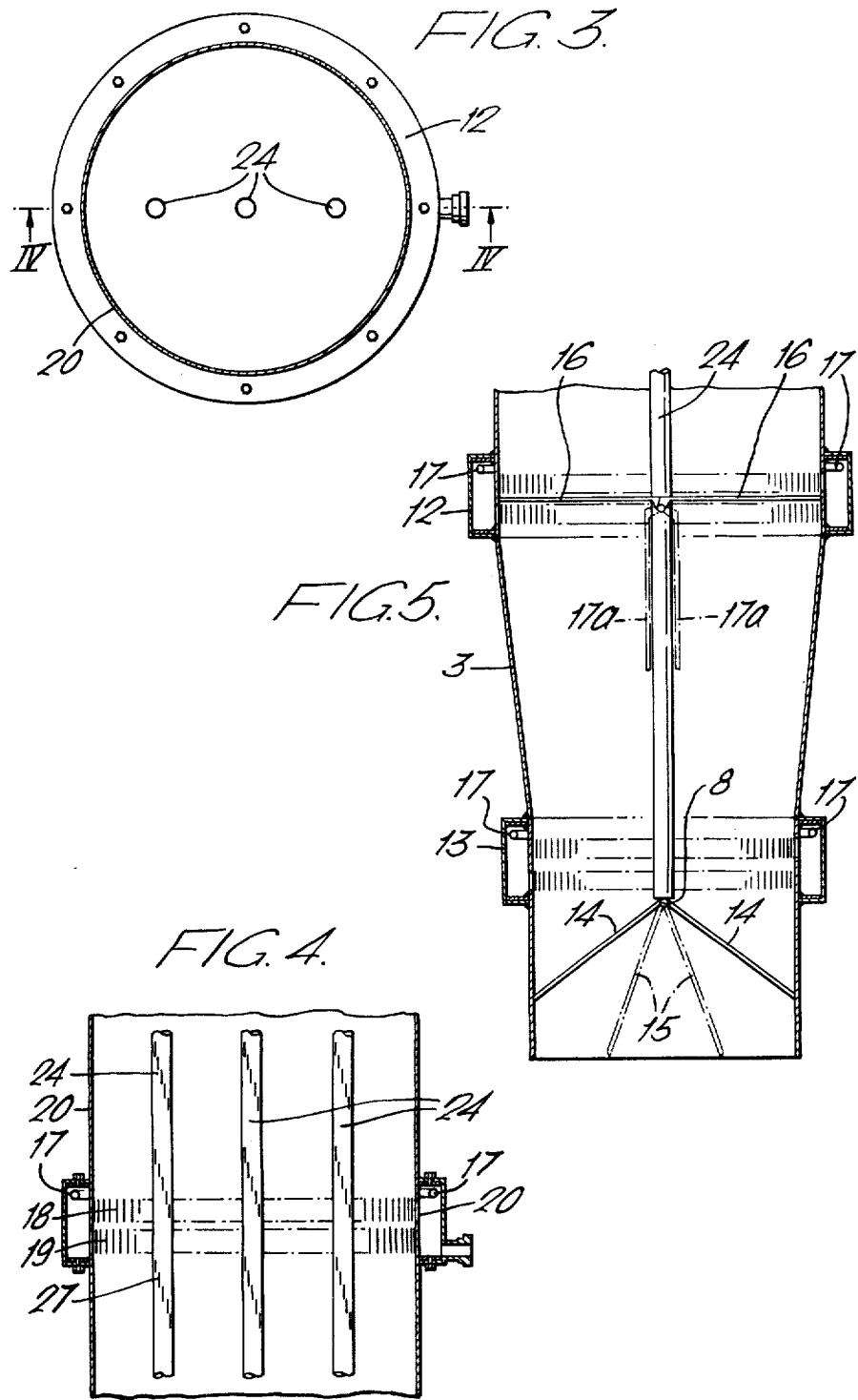

METHOD AND APPARATUS FOR CHEESE MANUFACTURE

This is a continuation of application Ser. No. 271,236, filed July 13, 1972 now abandoned.

BACKGROUND OF THE INVENTION

This invention relates to cheese making.

In the manufacture of cheese e.g. Cheddar cheese, it has been accepted in the industry for many years, that there should normally be some flow of the curd particles over a curd fusion period, usually referred to as the cheddaring time. There are several ways in use for achieving this flow and in this Specification the word flow is used as it is used in the art namely to imply elongation of the particles formed when the milk coagulum is cut earlier in the process. For example, in the mechanized system known by the trade name CHEDDARMASTER, this flow is achieved by placing the curd in boxes which are not completely filled and repositioning the boxes at intervals of time so that different surfaces thereof are uppermost. As a result, the curd within the boxes moves or flows during the cheddaring process. Although the costs of this method of cheddaring are less than the traditional methods it still involves either considerable capital outlay or considerable labour use or both and, in addition, a considerable amount of space is utilised when dealing with the large amounts of cheddar cheese produced in a modern dairy factory. Accordingly the cost of the cheddaring process as at present carried out in the CHEDDARMASTER system is somewhat high, and the version of the equipment which handles the cheddar boxes mechanically has a considerable number of moving parts with consequent risk of breakdown and, in any event, requiring considerable maintenance.

SUMMARY OF THE INVENTION

It is therefore an object of the present invention to provide a method of and/or apparatus for use in the manufacture of cheese which will obviate or minimise the foregoing disadvantages in a simple yet effective manner, or which will at least provide the public with a useful choice.

Accordingly, in one aspect, the invention consists in a method of cheesemaking, said method including the steps of elevating adequately drained curd to an upper part of a curd fusion chamber said curd fusion chamber having horizontal cross sections which diminish gradually in area between said upper part and a lower discharge part thereof, allowing the curd to remain in part of the curd fusion chamber for a sufficient period of time as to allow a desired hydrogen ion concentration i.e. pH value to be obtained in the curd, and discharging the curd from said lower discharge part in a manner such that the curd first admitted to the chamber is first discharged therefrom, and consolidation and some flow of curd occurring in a substantially vertical direction during passage of the curd through the curd fusion chamber.

In a further aspect the invention consists in apparatus for use in making cheese, said apparatus comprising a curd fusion chamber having cross sections which decrease gradually in area from an upper part to a lower part, feeding means adapted to feed drained curd to the curd fusion chamber in a manner such that the said curd is deposited on top of curd already in the chamber, the dimensions of the chamber being such that the curd may be held therein for a period of time sufficient to permit a required hydrogen ion concentration i.e. pH value to be obtained after a suitable period of time of holding, delivery means adapted to deliver substantially fused curd from said curd fusion chamber in a manner such that curd first fed to the curd fusion chamber is first discharged therefrom, the construction and arrangement being such that curd may be fed into said curd fusion chamber, held there for a desired period of time, and delivered therefrom after such period of time has elapsed, with consolidation and some flow of curd occurring in a substantially vertical direction during passage of the curd through the curd fusion chamber.

BRIEF DESCRIPTION OF THE DRAWINGS

One preferred form of the invention and modifications thereof will now be described with reference to the accompanying drawings in which FIG. 1 is a diagrammatic side elevation of apparatus according to the invention, FIG. 2 is a diagrammatic end view of the curd fusion chamber shown in Figure 1, FIG. 3 is a diagrammatic cross section of a part of apparatus similar to that shown in FIGS. 1 and 2, FIG. 4 is a diagrammatic section on the line IV—IV FIG. 3 and FIG. 5 is a further diagrammatic part section showing alternative forms of the invention which allow flow of initial deposits of curd.

DETAILED DESCRIPTION OF PREFERRED EMBODIMENTS

In this preferred form of the invention, plant adapted to receive curd made from milk which is pasteurised, in this example, at the rate of 7,000 imperial gallons per hour will be described. Accordingly, curd entering a curd fusion chamber or tower will be roughly proportional to this pasteurising rate, but there may be peak rates equivalent to pasteurisation at about 8,000 imperial gallons per hour.

In the process described it is assumed that one imperial gallon of milk will yield a maximum of 1.2 pound of cheese, and the capacity of the equipment is designed to permit a cheddaring period of up to 2½ hours. In the preferred form of the invention, the aim was to design a low cost method of curd fusion in which the apparatus would have few moving parts yet could deal with the large quantities of cheese necessary in modern dairy factories. The intention was that the equipment would induce some flow in the curd as this is widely believed to be of significance in establishing finished Cheddar cheese. It was also the intention that adequate provision should be made for draining off of whey released from the curd during holding in the chamber for the desired hydrogen ion concentration to develop. Accordingly, equipment was designed as follows:

A curd fusion chamber in the form of a tower 1 is constructed having an upper cylindrical portion 2 approximately 16 feet high and 4 feet 6 inches in diameter. This portion is mounted concentrically with at least one section having sides converging downwardly inwardly e.g. a transition portion 3 having sides converging downwardly inwardly. This portion is about 8 feet long, and the lower cross section thereof is a rectangle 4 approximately 2 feet 6 inches by 3 foot 6 inches. This rectangle in turn leads to delivery means comprising one or more e.g. a pair of delivery tubes or delivery nozzles 5, the two nozzles being separated by a two sided steep tent or angle plate formation 6 of 6 inch base width i.e. the adjacent walls of the two nozzles are attached to each other at the upper end and then slope away at an acute angle from each other downwardly outwardly so that upper parts of each tube 5 have a slightly greater cross section than lower parts thereof. The two nozzles at the orifices are of a suitable desired shape e.g. are approximately 1 foot by 3 feet 6 inches separated by a distance 7 of about 6 inches. In an alternative proposal shown in the lower part of FIG. 5, the walls 14 of the tent may be hinged at the apex 8 and turnable to adjust the angle between them, e.g. from a shut off position as shown in full in FIG. 5 against the walls to a working portion shown in pecked lines 15 in FIG. 5.

Closures e.g. cut off gates or doors 9 are provided in the orifices of the nozzles, these comprising guided plates which are operated by pneumatic or hydraulic piston and cylinder assemblies 10, and arranged so that bars of curd delivered from the tubes 5 will be cut off to form blocks 11 by closing the gates or doors and the flow stopped.

In a still further alternative a secondary set of closures e.g. cut off gates or doors is provided some distance above those already described so that the curd which first enters the chamber may be held above the main gates for a period and then permitted to descend to them so that some flow is induced in the first curd to enter the chamber as a result of its movement into a region of smaller cross section. By way of example these secondary gates may be positioned at the junction between the circular section 2 and the transition portion 3 of the chamber. Thus referring to the upper part of FIG. 5. Further secondary closures 16 may be provided (alternative to the hinged doors 14) which are again turnable from a closed position shown in full to an open position shown in pecked lines 17a. Thus in the alternative cases of the doors 14 and 16 the intended use is that the closures are closed during initial filling and then opened so that some flow even of the initially filled curd occurs. Obviously a suitable guiding arrangement or arrangements (not shown) is or are provided for the gates or doors in each case.

The curd fusion chamber is provided with drainage means, for example, a channel 12 disposed between the junction of the cylindrical portion 2 and the top of the tapered portion 3 and a further rectangular channel 13 separating the junction between the lower part of the tapered portion 3 and the tubes 5. In each case, these channels are between the main members forming the curd fusion chamber, and slots 18 and 19 (FIG. 4) are provided in the walls 20 of the channels forming part of the cheddaring chamber to enable whey released from the curd to escape from the chamber and be led away through pipes 22 and 23 to a collecting point, the whey being then separated to recover the fat therefrom. A pipe 17 is placed in each of the channels 12 and 13, the pipe 17 having jet orifices (not shown) which are directed inwardly and downwardly and are used to spray water on the slots 18 and 19 to remove curd which may have peeled off the main mass of curd as the latter passes through the chamber the spraying being effected before c.i.p treatment of the slots into the curd fusion chamber by back flushing. The drainage channel 12 is constructed separately from the cylindrical section but may be welded to it after fabrication and the slots 18 and 19 total 6 inches long in two bands of 3 inch long slots orientated vertically at 1½ inch centres on the wall of the chamber to permit whey drainage. In addition, means for draining whey from the curd mass which is disposed away from the chamber walls is provided, comprising for example, three slotted vertical pipes 24, which in use are surrounded by curd and which terminate on the apex 8 of the tent with openings leading to the interior of the tent, and thence to a whey collecting point (not shown). The slots 27 are arranged as a double start helix of shorter pitch at the bottom than at the top to give a greater density of slots nearer the bottom. The tower 1 is suitably supported e.g. by frame members 25 and 26 so as to be arranged with its longitudinal axis substantially vertical, and with the cut off doors 9 at a suitable height e.g. 11 feet, above the ground. The purpose of this is so that a delivery mechanism may be provided constructed as follows:

A hopper 31 is arranged at a suitable distance below the tubes 5 so that the curd blocks 11 of a suitable size e.g. 10 inches deep by 12 inches wide by 42 inches long may be cut off by the gates. Above the mouth 32 of the hopper, a hinged platform 33 hinged on a horizontal pivot is provided and held lightly in an upper preferably horizontal position by a pneumatic or hydraulic piston and cylinder assembly 34 spring or other suitable counterbalance. The hopper 31 is arranged to receive the platform 33, and the hopper has a passageway 35 feeding downwardly to a suitable curd mill 36 e.g. that sold under the trade mark CHEDDARMASTER which is also known as a Berry mill. The arrangement of the platform 33 and the passageway 35 relative to the curd mill 36 is such that the blocks of curd are delivered to the curd mill 36 orientated so that milled fingers of curd are formed with the length of each finger substantially parallel to the direction of curd flow or elongation. The mill is such that the blocks when delivered by downward tilting of the hinged platform will rest on top of the drum cutter of the mill and such that if a a block has not cleared the hinged platform, then the latter will not return to the horizontal disposition. The platform is interlinked with the gate operating mechanism at the orifices through door opening inhibiting means so that when on automatic discharge curd flowing from the orifices reaches and slightly depresses the platform the gates are closed and do not open again until this platform is again in the horizontal disposition. Thus, the rate of cutting in the mill controls the rate of delivery of blocks from the tower. Manual operation is also provided for.

In an alternative construction, it is proposed that the feeding of the curd through the tubes 5 is such as to divide the curd into the usual curd fingers instead of blocks and thus serve as an integral mill. To this end, a series of blades will be provided some in a north south disposition across the nozzles, and others in a east west disposition, some of those in the north south disposition being arranged in one plane and some in another plane, and preferably some in one or more still further planes, and the same disposition arranged with the east west cutters. The purpose of this is to reduce the resistance offered by the cutting knives or blades by reducing the cross sectional area of blades in any one plane. The cutters cut the curd into bars or ribbons and a transverse oscillating cutting knife cuts the bars or ribbons into fingers. In this event, the curd mill could be dispensed with and the cut curd delivered directly to for example, equipment for further draining and salting of the curd. As a further alternative, knives or blades may be disposed in a more open grid formation to provide small blocks suited to conventional reciprocating mills such as the mill of equipment known as Cheesemaker III. The top of the tower is provided with a lid 41 and may be pressurised as will be described further later, by air from the pneumatic conveying system (to be described). In another alternative a curd mill such as the type known as CHEDDARMASTER or even a conventional reciprocating mill may be built integral with the orifice or orifices of the tower eliminating the necessity for the cut off doors 9.

At some stages e.g. when the tower is nearly empty, some pressurisation may be needed to effect final discharge of the tower contents through the tubes 5. This is particularly likely when integral milling takes place through the grid of knives. However, this can be readily provided.

Below the milling cutter whether it be integral or a separate unit, there is provided a drainage and salting mechanism e.g. a CHEDDARMASTER draining conveyor 51 and associated equipment which being known is not described in detail. The delivered curd is then passed over this draining conveyor for draining and/or salting, and then fed to pressing boxes or otherwise as desired.

In addition another drainage conveyor or system or the CHEDDARMASTER conveyor 51 may be utilised to drain curd, for example, direct from a vat for feeding to the tower 1 above described. Thus, the delivery end of the draining conveyor or other source of drained curd supplies a pneumatic conveying system constructed as follows:

A base or trolley 61 is provided on which is mounted an air blower or compressor 62 with its associated motor 63, pressure relief valve 64, non return valve 65 and a feed pipe 66 having associated with it a rotary valve through which curd is fed from the drainage conveyor through a reverse taper hopper 68 i.e. a hopper tapering downwardly outwardly from the inlet 69. The inlet 70 to the air blower is from an air return pipe 71 connected to the lid 41 of the tower. Alternatively, fresh, preferably filtered, air may be drawn into the inlet of the blower and the spent air used for conveying discharged to the atmosphere. The outlet 72 from the rotary valve 67 is connected to the tower in a manner such that curd delivered is placed on top of the curd already in the tower through an outlet nozzle 73 which is arranged tangentially in an upper part 74 of the cylindrical portion of the tower and is of somewhat enlarged cross section to reduce the velocity of delivery of curd and air from the feed pipe 66. Also the feed gives some horizontal motion to the curd so that the curd descends relatively gently in the tower compared with a direct air feed. The feed pipe and the return air pipe may be, for example, of 3 inch O.D. stainless steel tube and, preferably, the changes in direction particularly of the delivery pipe are arranged to be of curves of reasonably large radius to reduce the frictional effect on and impact damage to the curd. Although not shown in detail the lid 41 of the tower carries vacuum and pressure relief valves, a port for return of air to the blower, an inspection port for viewing the curd contents, and one or more perforated i.e. spray balls or roses for cleaning in place. The circular upper cross section is, as stated, 16 feet high and this is 2 feet higher than is necessary when the cheddaring time is at the tower's design maximum of 2½ hours. The drainage paths provided serves also as cleaning in place (c.i.p) passageways which permit pumping of cleaning solution in the opposite direction to whey flow. Also, the drainage channels 12 and 13 permit c.i.p. by reversing the flow. The pneumatic conveyor system feed enters just below the lid of the tower and the cross sectional area of the last few feet of the delivery tube is approximately doubled to lower curd velocity at the point of entry. The tangential entry ensures uniform and gentle negative acceleration of the curd as it starts to spiral downwardly when the tower is filling. The return air line 71 from the lid 41 of the tower 1 to the input 70 of the blower assists in providing saturated air to be used for conveying, but in addition, an additional air entry and filter (not shown) is provided to provide make up air due to losses through the rotary valve. When the ambient temperature is high and some evaporative cooling of the curd is desired, the return air line 71 may be disconnected and fresh, preferably filtered, air used for conveying. A pressure switch (not shown) set slightly lower than the relief valve 64 shuts down the rotary valve 67 in the event of more curd being fed into the elevator line than can be handled. We have found in practice that this rotary valve raely shuts down, and when it shuts down it usually does so for no more than a second or two. A three way valve is connected to the air filter and located shortly before the blower is on the return air line.

The use of the construction is as follows:

The curd fusion tower represents an extremely compact simple system for the cheddaring of the well drained curd from the CHEDDARMASTER draining conveyor, or any other appropriate source of adequately drained curd. The curd is passed through the reverse taper hopper 68 into the rotary valve 67 and is delivered by the pneumatic lift system to the top of the tower. The curd spirals down to the bottom of the tower and the level builds up until the first curd has been in the tower for 2 hours, and, by this time the tower will be approximately four-fifths full. If hydrogen ion development is sufficient, discharge may now commence from the bottom, meanwhile further curd may be added provided the filling and emptying rates are reasonably matched. The initial curd will not have "flowed" (using that word in the specification as it is used in the industry) to any material extent, and it is for this reason that it has been suggested that the tent walls should be hinged or the doors 16 used so that some flow can occur, as it moves through an initially narrow orifice. However, to date, we have not found any material deterioration in cheese quality through this lack of flow, and after the first few blocks have passed, adequate flow is attained and maintained because of the shape of the transition section, and because of the tenting provision in the nozzles.

Discharge is commenced and this is achieved by opening the two shut off doors 9 until approximately two ten inch lengths of curd 11 (approximately 400 lbs) have extruded through the openings and reach the swinging platform 33 which actuates the closing of the cut off doors. These remain closed until the two resultant blocks are in the throat of the CHEDDARMASTER mill 36, and are clear of the swinging platform 33, and the platform has returned to the upper position. At this stage, the supply of air to the rams 10 coupled to the doors is automatically reversed causing them to be opened. Two further blocks are then cut off and slide into the mill hopper. This is repeated as required by the milling rate, and at the same time curd from further vats continues to enter the tower. The level of the curd within the tower is maintained approximately constant by controlling the r.p.m. of the mill to match the hourly average input to the tower.

Towards the end of the day's operations, when curd supply to the top of the tower ceases, the level within the tower naturally decreases, and the rate of flow through the two tubes 5 at the bottom decreases, but is compensated for by an automatic increase in the time that the doors are open. Flow of curd may be assisted by pressure on the upper part of the tower with air pressure if desired to maintain sufficient pressure on the curd as to effect discharge thereof. The output of the mill remains virtually constant until all curd has been discharged from the tower, for the discharge tubes 5 are capable of discharging curd several times faster than is required for constant milling rate even when the tower is almost empty.

Cleaning in place is effected, and when the last of the day's curd has been delivered into the tower, it is followed by a few gallons of clean warm water to flush the pneumatic conveying line and remove any curd particles remaining in the inlet hopper or rotary valve. The non return valve 65 prevents back flow of water into the blower 62. The warm water drains away from the surface of the last curd in the tower through the central draining tubes. After emptying of the tower, an appropriate c.i.p solution is blown through the curd delivery system. The spray ball referred to above at the top of the tower supplements the cleaning contribution by the fluid blown through the curd elevating system. After flushing any curd from the drainage channels 12 and 13 with c.i.p liquid pumped through tubes 17 the initial cleaning of the chamber is augmented by passing c.i.p solution through the two sets of drainage slots and the three vertical drainage tubes. The cleaning solution flows from the tower through the discharge orifices and provides preliminary cleaning of the swinging platform, hopper and mill. This is followed by final cleaning by numerous cutter jets located above the hopper and jets within the drum of the mill.

Under some circumstances, it may be desirable to instal a subsidiary tower holding say two vats of curd, where it is a reasonably common occurrence for one or more vats to be abnormally slow in hydrogen ion development. Many factories do not experience this type of problem but rather they have all vats running normally or all vats running rather slow in hydrogen ion development.

The process may be operated either as a batch process or a substantially continuous process as above described. Where tower height is a problem for one reason or another the total height may of course be reduced by using two towers of appropriately lower height. The curd from these may be delivered to a common mill. Alternatively the chamber may be of greater diameter.

It is relevant at this point, that the tower design gives essentially plug flow through the tower which means that a given vat of curd can be segregated on the belt with an accuracy of plus or minus perhaps 5 40 pound cheeses. This is done simply from a knowledge of the quantity and yielding capacity of individual vats and the length of milled curd to which this corresponds on the milling/salting conveyor at a given belt speed. It may also be done by counting the revolutions of the mill as the mill's output is substantially constant.

Under some circumstances, it may be desirable to provide a coating or pellicle of a material with a low coefficient of friction, for example polytetrafluroethylene to converging surfaces of the tower or discharge means e.g. to the inner surfaces of the tower from the upper draining channel to the bottom of the discharge orifice, immediately above the cut off doors.

We have found that the foregoing method and apparatus at least in the preferred form, give considerable advantages.

Firstly we have found that the draining of the curd before passing it to the curd fusion tower and as a corollary to this, the draining of the curd during its passage through the tower, give a superior finished cheese.

Secondly by constricting the curd by providing inwardly downwardly converging walls over at least part of the path of the curd, this gives controlled and substantially vertical flow to the curd and produces a frictional effect. This frictional effect is again controlled, in the preferred form, by the PTFE coating on the surfaces of the converging portions, which we have found to give advantageous results.

Thirdly material economies in salt usage are obtained compared to those which would be obtained if either or both draining provisions are omitted.

Fourthly we have found that the process and apparatus enable standardised conditions to be reached quickly.

We claim:

1. A method of cheesemaking using a vertical curd fusion chamber with an upper admitting portion having sides which are substantially parallel and a lower tapered portion terminating at its lower end in a discharging portion so that curd is admitted to said upper portion and is discharged from said lower portion, said curd fusion chamber in said tapered portion having a horizontal cross section which diminishes gradually in area between said admitting portion and said discharging portion, said method comprising the steps of:
   a. elevating adequately drained curd through pneumatic conveying apparatus to said upper admitting portion of said fusion chamber;
   b. feeding the curd to said upper admitting portion through a horizontal nozzle arranged tangentially with respect to the walls of said upper admitting portion;
   c. allowing the curd to remain in the fusion chamber until a desired hydrogen ion concentration is developed therein;
   d. draining the curd by drains both in the external wall of said curd fusion chamber and by internal slotted vertical pipes which in use also serve to resist downward movement of the curd as it passes downwardly through the chamber;
   e. discharging the curd from said discharging portion such that curd first admitted to said fusion chamber is first discharged therefrom, causing consolidation to occur in a substantially vertical direction during passage of the curd through said curd fusion chamber;

f. dividing the descending curd into a plurality of separate columns prior to discharge from said curd fusion chamber;

g. cutting the discharged columns of curd into blocks as it is discharged from said fusion chamber; and h. delivering the discharged blocks of curd to a curd mill for further milling in a manner such that the blocks are oriented so that milled fingers of curd are formed with the length of each finger substantially parallel to the direction of curd flow.

2. A method as claimed in claim 1 which includes the steps of leaving the curd in the curd fusion chamber for a period of approximately two hours, continually adding curd to that already in the chamber during said period and before discharge of curd is allowed; regulating the rate of discharge from and rate of feed to the curd fusion chamber after discharge of curd therefrom has commenced so that if desired a substantially constant level of curd is maintained in the chamber during the major part of the discharging process.

3. A method as claimed in claim 1 which includes the step of using the rate of milling of the blocks of curd to control the rate of delivery of blocks for milling.

4. A method as claimed in claim 1 which includes the step of utilising a low friction material on converging surfaces of said curd fusion chamber.

5. The method of cheesemaking as claimed in claim 1, wherein the dividing of the discharging curd into a plurality of columns of curd is effected by means of a two-sided angle plate or tent centrally disposed in said curd fusion chamber.

6. A method of cheesemaking using a vertical curd fusion chamber with an upper admitting portion having sides which are substantially parallel and a lower tapered portion terminating at its lower end in a discharging portion so that curd is admitted to said upper portion and is discharged from said lower portion, said curd fusion chamber in said tapered portion having a horizontal cross-section which diminishes gradually in area between said admitting portion and said discharging portion, said method comprising the steps of:

a. elevating adequately drained curd through pneumatic conveying apparatus to said upper admitting portion of said fusion chamber;

b. feeding the curd to said upper admitting portion through a horizontal nozzle arranged tangentially with respect to the walls of said upper admitting portion;

c. allowing the curd to remain in the fusion chamber until a desired hydrogen ion concentration is developed therein;

d. draining the curd by drains both in the external wall of said curd fusion chamber and by internal slotted vertical pipes which in use also serve to resist downward movement of the curd as it passes downwardly through the chamber;

e. discharging the curd from said discharging portion such that curd first admitted to said fusion chamber is first discharged therefrom, causing consolidation to occur in a substantially vertical direction during passage of the curd through said curd fusion chamber;

f. dividing the descending curd into a plurality of separate columns prior to discharge from said curd fusion chamber;

g. forcing the discharged columns of curd through cutters which cut the curd into bars; and h. operating transverse cutters to cut the bars into fingers.

7. Apparatus for use in making cheese, said apparatus comprising: a vertical curd fusion chamber with an upper admitting portion having sides which are substantially parallel and a lower tapered portion having a cross section which decreases gradually in area from top to bottom of said lower portion; pneumatic feeding means for elevating drained curd to said upper admitting portion; said feeding means terminating at said admitting portion in a horizontal nozzle arranged tangentially with respect to said admitting portion so that the curd is deposited in the vicinity of the walls of the chamber on top of curd already in said curd fusion chamber; said curd fusion chamber having dimensions such that curd may be held therein for a period of time sufficient to permit a required hydrogen ion concentration to be obtained after a suitable period of time of holding; an external draining system including members defining apertures in the walls of said curd fusion chamber leading to passageways outside the curd fusion chamber; an internal draining system including a plurality of slotted vertical pipes disposed internally within the curd fusion chamber so as to be surrounded by curd in use; delivery means in the bottom of said lower portion for delivering curd from said curd fusion chamber in a manner such that curd first fed to the curd fusion chamber is first discharged therefrom, said delivery means including a plurality of delivery tubes which separate the descending curd into a plurality of separate columns; means for cutting the discharged columns of curd into blocks as it is discharged from said fusion chamber; and means for delivering the discharged blocks of curd to a curd mill for further milling, such that the blocks are oriented so that milled fingers of curd are formed with the length of each finger substantially parallel to the direction of curd flow.

8. Apparatus as claimed in claim 7 wherein said delivery means comprises at least one delivery nozzle of a suitable cross section, upper parts of each nozzle having a slightly greater cross section than the lower parts thereof, so that there is a converging of the walls of each nozzle towards the orifice thereof.

9. Apparatus as claimed in claim 8 wherein a part of nozzles are placed side by side with a dividing two sided angle plate or tent, said dividing tent having side walls at a desired angle between each other.

10. Apparatus as claimed in claim 9 wherein said walls of said tent are hinged so that they may be turned away from each other before filling commences and closed to their operative position during starting up of the discharge process to cause at least some change in disposition or flow of the curd first deposited in the chamber.

11. Apparatus as claimed in claim 10 wherein closure means is provided in said fusion chamber at some distance above said delivery means said closure means being closed in use during starting up and then opened to cause at least some change in disposition or flow of the curd first deposited in the chamber.

12. Apparatus as claimed in claim 11 wherein said delivery means includes at least one cut off closure means having cutting edges thereon and being such as to close said delivery means during filling and until hydrogen ion development is adequate for discharge to commence; operating means for causing said cut off closure means to be operable in a manner such that when at least one bar of curd of suitable size has been extruded through said delivery means said cut off closure means cuts off said blocks of curd from the curd still remaining within said curd fusion chamber.

13. Apparatus as claimed in claim 12 wherein a hopper is provided for feeding said cut off blocks of curd to a curd mill which hopper is associated with a moveable platform moveable between two positions, said platform being held in one position while the blocks of curd passing to said curd mill, are in contact therewith and door opening inhibiting means which prevents opening of said cut off doors while said platform is in said first position and when blocks of curd have been freed from contact with said platform by having been fed into said curd mill, said platform moves to an upper block receiving position and said door opening inhibiting means operates to cause said closure means to open to permit extrusion of further bars of curd for cutting into blocks.

14. Apparatus as claimed in claim 13 wherein said platform is pivoted on a horizontal pivot and a pneumatic piston and cylinder arrangement actuates said platform to the raised disposition.

15. Apparatus as claimed in claim 7 wherein said pneumatic feeding means comprises a rotary valve, means to create a flow of air in said feeding means, and outlet means adapted to feed the conveyed curd into an upper part of said curd fusion chamber.

16. Apparatus as claimed in claim 15 wherein a pressure switch operated by air pressure in said outlet means controls said rotary valve to prevent delivery of curd to said outlet means when air pressure in said outlet means rises above a predetermined level.

17. Apparatus as claimed in claim 16 wherein said outlet means includes an enlarged outlet section adapted to reduce the velocity of flow of air and curd into said curd fusion chamber.

18. Apparatus as claimed in claim 17 wherein curd is fed to the said curd fusion chamber from a means for draining whey from curds and whey which is normally produced in a cheese vat.

19. Apparatus as claimed in claim 18 wherein said means for draining the whey from curds and whey supplies drained curd to said pneumatic conveying means is through a reverse taper hopper which feeds curd to said rotary valve.

20. Apparatus as claimed in claim 19 wherein air pressure supply means are provided adapted to supply air under pressure to the top of curd in said curd fusion chamber for the purpose of assisting in emptying said chamber of curd.

21. Apparatus as claimed in claim 20 wherein a material of low coefficient of friction is applied to converging surfaces along the path of travel of the curd.

22. Apparatus as claimed in claim 21 wherein said material of a low coefficient of friction comprises a coating of polytetrafluroethylene.

23. Apparatus as claimed in claim 7, wherein said internal draining system includes a two-sided plate or tent having side walls at a desired angle between each other, and said vertical pipes terminate on the apex of said tent.

24. Apparatus as claimed in claim 23 wherein said vertical pipes run into apertures leading to the interior of the tent.

25. Apparatus as claimed in claim 7 wherein tilting platform means is provided to receive the cut off blocks and deliver these blocks to said curd mill.

26. Apparatus for use in making cheese, said apparatus comprising: a vertical curd fusion chamber with an upper admitting portion having sides which are substantially parallel and a lower tapered portion having a cross-section which decreases gradually in area from top to bottom of said lower portion; pneumatic feeding means for elevating drained curd to said upper admitting portion; said feeding means terminating at said admitting portion in a horizontal nozzle arranged tangentially with respect to said admitting portion so that the curd is deposited in the vicinity of the walls of the chamber on top of curd already in said curd fusion chamber; said curd fusion chamber having dimensions such that curd may be held therein for a period of time sufficient to permit a required hydrogen ion concentration to be obtained after a suitable period of time of holding; an external draining system including members defining apertures in the walls of said curd fusion chamber leading to passageways outside the curd fusion chamber; an internal draining system including a plurality of slotted vertical pipes disposed internally within the curd fusion chamber so as to be surrounded by curd in use; delivery means in the bottom of said lower portion for delivering curd from said curd fusion chamber in a manner such that curd first fed to the curd fussion chamber is first discharged therefrom, said delivery means including a plurality of delivery tubes which separate the descending curd into a plurality of separate columns; and cutting means associated with said delivery means adapted to cut delivered curd into fingers.

27. Apparatus as claimed in claim 26 wherein said cutting means includes a grid of cutters arranged in said delivery means, some in one set of parallel planes and others in a further set of parallel planes substantially normal to the first set of parallel planes and a further cutter arranged to oscillate in a plane normal to the line of curd delivery.

* * * * *